United States Patent
Foo et al.

(10) Patent No.: US 6,529,810 B2
(45) Date of Patent: Mar. 4, 2003

(54) METHOD AND APPARATUS FOR CONTROLLING AN ACTUATABLE RESTRAINING DEVICE USING SWITCHED THRESHOLDS BASED ON TRANSVERSE ACCELERATION

(75) Inventors: Chek-Peng Foo, Ann Arbor, MI (US); Paul Leo Sumner, Farmington Hills, MI (US); Timothy Chester Wright, Ann Arbor, MI (US); Meng-Fu Tsai, Ann Arbor, MI (US); Suthep Thanapathomsinchai, Ann Arbor, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/829,115

(22) Filed: Apr. 9, 2001

(65) Prior Publication Data

US 2002/0147533 A1 Oct. 10, 2002

(51) Int. Cl.$^7$ .............................. B60R 22/00; G06F 7/00
(52) U.S. Cl. .................. 701/45; 701/46; 280/734; 280/735; 180/271; 180/282; 307/10.1
(58) Field of Search ................... 701/36, 45, 46, 701/47; 280/734, 735, 728.1, 730.1, 730.2, 802; 180/271, 282, 268; 307/9.1, 10.1; 340/436, 435, 439

(56) References Cited

U.S. PATENT DOCUMENTS

| | | | | |
|---|---|---|---|---|
| 5,546,307 A | * | 8/1996 | Mazur et al. ............... | 180/274 |
| 5,692,775 A | * | 12/1997 | Foo ............................... | 280/735 |
| 5,702,124 A | * | 12/1997 | Foo et al. .................... | 280/735 |
| 5,732,374 A | * | 3/1998 | Ohm ........................... | 280/735 |
| 5,746,444 A | * | 5/1998 | Foo et al. .................... | 180/282 |
| 5,935,182 A | | 8/1999 | Foo et al. ..................... | 701/45 |
| 6,036,225 A | | 3/2000 | Foo et al. .................... | 280/735 |
| 6,170,864 B1 | | 1/2001 | Fujita et al. ................. | 280/735 |
| 6,186,539 B1 | | 2/2001 | Foo et al. .................... | 280/735 |
| 6,347,268 B1 | * | 2/2002 | Fujita et al. ................. | 280/735 |

* cited by examiner

*Primary Examiner*—Jacques H. Louis-Jacques
(74) *Attorney, Agent, or Firm*—Tarolli, Sundheim, Covell & Tummino L.L.P.

(57) ABSTRACT

The present invention is directed to controlling a vehicle multistage actuatable occupant restraining system (14, 18). A crash sensor (32, 36) senses crash acceleration and provides a crash acceleration signal (110, 160) indicative thereof. Crash velocity and crash displacement are determined (118, 168) in response to the crash acceleration signal. A first stage (90, 94) of the multistage actuatable occupant restraining system is actuated when the determined crash velocity as a function of crash displacement exceeds a low threshold (130, 132, 180, 182). A transverse accelerometer (34) senses transverse crash acceleration. The transverse acceleration as a function of the crash displacement is compared (226, 278) against a transverse threshold (268). The value of the low threshold (130, 180) is switched to a different value (132, 182) when the transverse acceleration exceeds the transverse threshold.

10 Claims, 4 Drawing Sheets

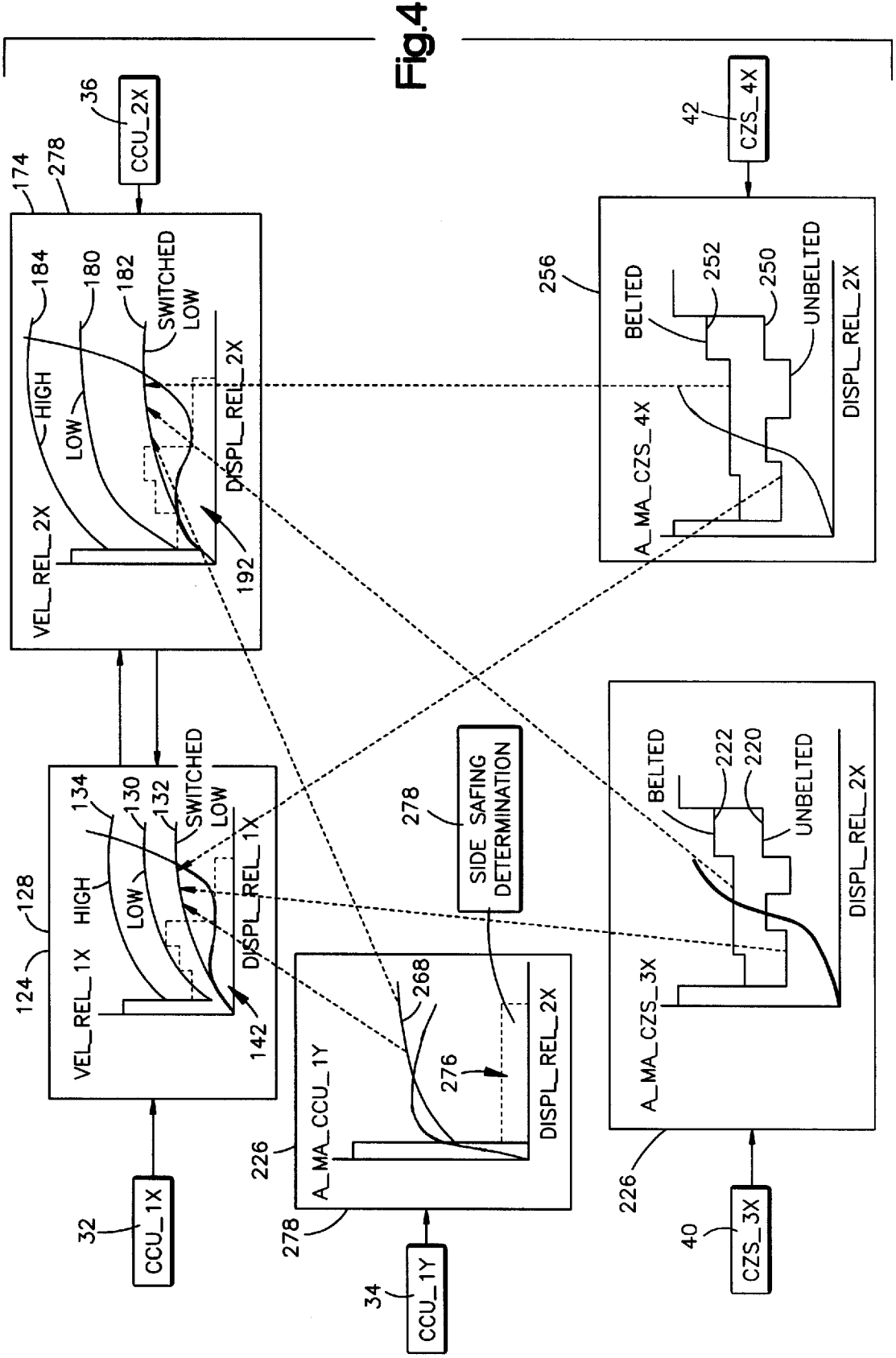

METHOD AND APPARATUS FOR CONTROLLING AN ACTUATABLE RESTRAINING DEVICE USING SWITCHED THRESHOLDS BASED ON TRANSVERSE ACCELERATION

FIELD OF THE INVENTION

The present invention relates to a method and apparatus for controlling a vehicle actuatable occupant restraining device.

BACKGROUND OF THE INVENTION

Air bag restraining systems in vehicles for vehicle occupants are known in the art. An air bag restraining device may include a multistage inflator where the stages are actuated at different times in response to vehicle crash conditions.

U.S. Pat. No. 5,935,182 to Foo et al., assigned to TRW Inc., discloses a method and apparatus for discriminating a vehicle crash condition using virtual sensing. U.S. Pat. No. 6,036,225 to Foo et al., assigned to TRW Inc., discloses a method and apparatus for controlling a multistage actuatable restraining system in a vehicle using crash severity index values. U.S. Pat. No. 6,186,539 to Foo et al., also assigned to TRW Inc., discloses a method and apparatus for controlling a multistage actuatable restraining device using crash severity indexing and crush zone sensors.

SUMMARY OF THE INVENTION

The present invention is directed to a method and apparatus for controlling a vehicle multistage actuatable occupant restraining system. A crash sensor senses crash acceleration and provides a crash acceleration signal indicative thereof. Crash velocity and crash displacement are determined in response to the crash acceleration signal. A first stage of the multistage actuatable occupant restraining system is actuated in response to the determined crash velocity as a function of crash displacement exceeding a low threshold. A transverse accelerometer senses transverse crash acceleration. The transverse acceleration as a function of the crash displacement is compared against a transverse threshold. The value of the low threshold is switched to a different value when the transverse acceleration exceeds the transverse threshold.

In accordance with another embodiment, the present invention is directed to a method and apparatus for controlling a vehicle multistage actuatable occupant restraining system. A crash sensor senses crash acceleration and provides a crash acceleration signal indicative thereof. Crash velocity and crash displacement are determined in response to the crash acceleration signal. A first stage of the multistage actuatable occupant restraining system is actuated in response to the determined crash velocity as a function of crash displacement exceeding a low threshold. A transverse accelerometer senses transverse crash acceleration. The transverse acceleration as a function of the crash displacement is compared against a transverse threshold. A crush zone accelerometer senses crush zone acceleration. The crush zone acceleration as a function of the crash displacement is compared against a crush zone threshold. The value of the low threshold is switched to a different value when at least one of the transverse acceleration exceeds the transverse threshold and the crush zone acceleration exceeds the crush zone threshold.

BRIEF DESCRIPTION OF THE DRAWINGS

The foregoing and other features and advantages of the invention will become apparent to one skilled in the art upon consideration of the following description of the invention and the accompanying drawings in which:

FIG. 4 shows graphical representations of determined crash related values and thresholds used in the control arrangement of the present invention.

DESCRIPTION OF PREFERRED EMBODIMENTS

Figure 1:
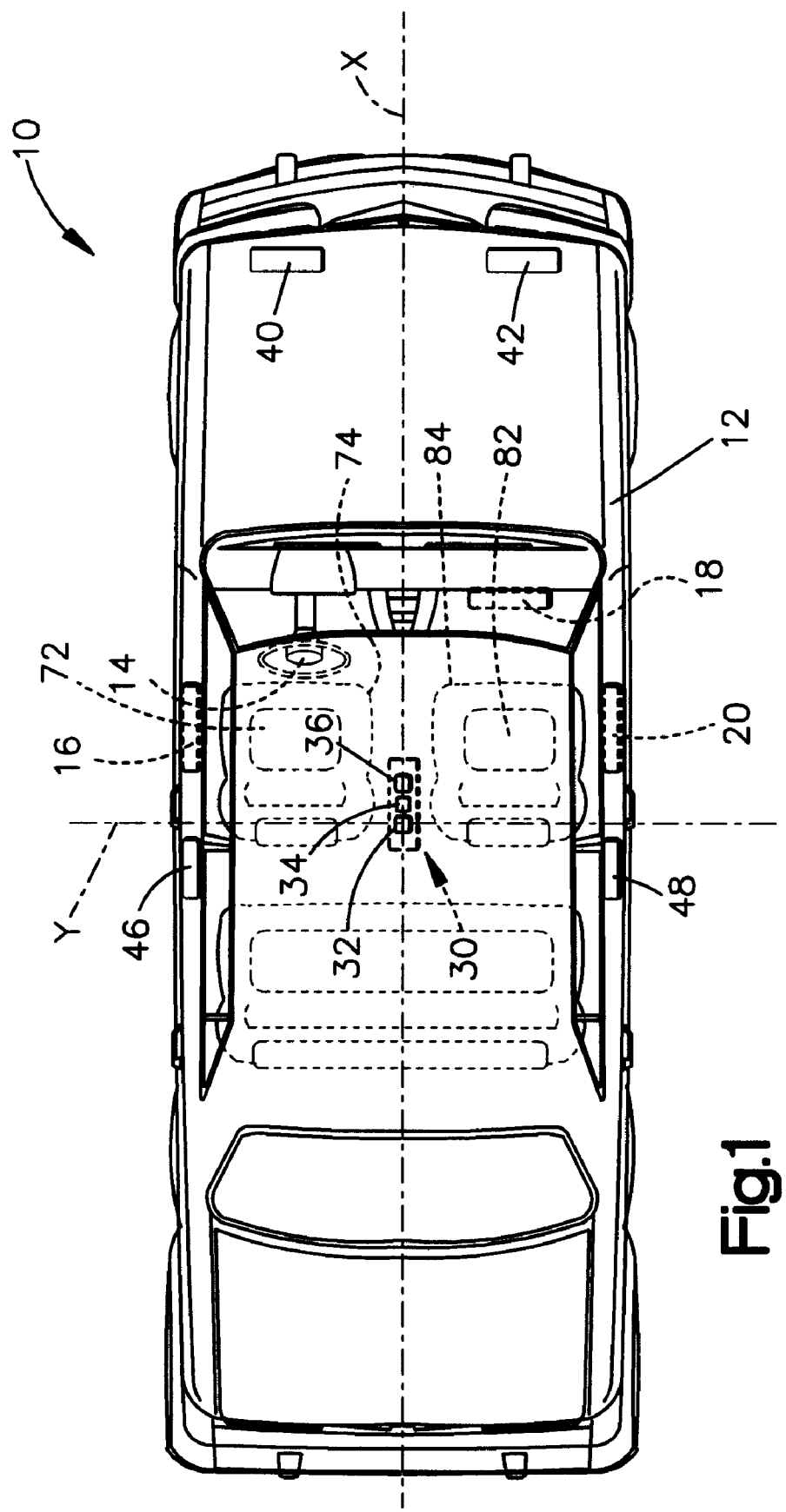
FIG. 1 is a schematic diagram of a vehicle having an actuatable occupant restraining system with a control arrangement in accordance with one embodiment of the present invention.
Figure 2:
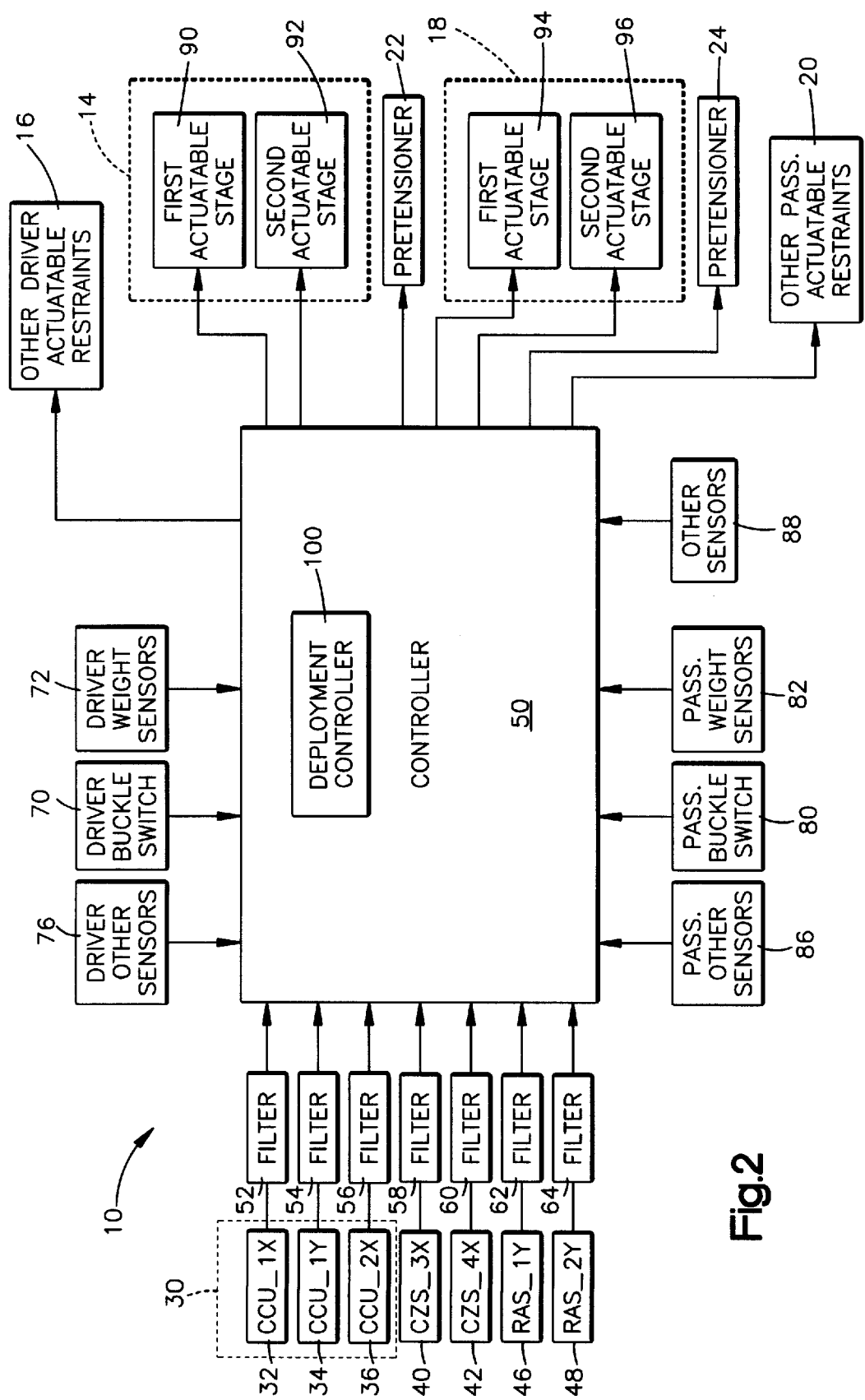
FIG. 2 is a schematic block diagram of the actuatable occupant restraining system shown in FIG. 1.

Referring to FIGS. 1 and 2, an actuatable occupant restraining system 10, in accordance with the present invention, in a vehicle 12, includes a driver's side, multistage, front actuatable restraining device 14, and a passenger's side, multistage, front actuatable restraining device 18. Other actuatable restraining devices could be included such as a driver's actuatable side restraining device 16 and a passenger's actuatable side restraining device 20. The actuatable occupant restraining system 10 could further include a driver's side pretensioner 22, and a passenger's side pretensioner 24. The present invention is not limited to use with an air bag restraining system. The present invention is applicable to any actuatable restraining device having multiple actuatable stages or to a plurality of actuatable restraining devices that can be simultaneously or sequentially actuated. A front air bag having plural actuatable stages is described for purposes of explanation. The invention is also applicable to a vehicle having multiple air bags wherein at least one of the air bags is a multistage air bag controlled in accordance with the present invention.

The system 10 includes at least one crash or collision sensor assembly 30 located at a substantially central location of the vehicle. Preferably, sensor assembly 30 includes a first crash acceleration sensor 32 having its axis of sensitivity substantially oriented to sense crash acceleration in the vehicle X direction (i.e., parallel with the front-to-rear axis of the vehicle) that provides a crash acceleration signal designated CCU_1X. The sensor assembly 30 further includes a second crash acceleration sensor 34 having its axis of sensitivity substantially oriented to sense crash acceleration in the vehicle Y direction (i.e., perpendicular to the front-to-rear axis of the vehicle) that provides a transverse crash acceleration signal designated CCU_1Y. The sensor assembly 30 further includes a third crash acceleration sensor 36 having its axis of sensitivity substantially oriented to sense crash acceleration in the vehicle X direction (i.e., parallel with the front-to-rear axis of the vehicle) that provides a crash acceleration signal designated CCU_2X.

The crash acceleration signals from the crash sensors 32, 34, 36 can take any of several forms. Each of the crash acceleration signals can have amplitude, frequency, pulse duration, etc., or any other electrical characteristics that vary as a function of the sensed crash acceleration. In accordance with a preferred embodiment, the crash acceleration signals have frequency and amplitude characteristics indicative of the sensed crash acceleration.

In addition to the crash acceleration sensors 32, 34, 36, the system includes forwardly located crush zone sensors 40, 42 located in a crush zone location of the vehicle 12. The sensor 40 is located on the driver's side of the vehicle and has its axis of sensitivity substantially oriented to sense crash acceleration parallel with the vehicle's X axis. The sensor 42 is located on the passenger's side of the vehicle and has its axis of sensitivity substantially oriented to sense crash acceleration parallel with the vehicle's X axis. The signal from the driver's side, crush zone sensor 40 is designated as CZS_3X and the signal from the passenger's side, crush zone sensor 42 is designated as CZS_4X.

The signals from the crush zone sensors 40, 42 also have frequency and amplitude characteristics indicative of the crash acceleration experienced at those sensor locations of the vehicle. The crush zone sensors are preferably mounted at or near the radiator location of the vehicle and serve to better discriminate certain types of crash conditions by supplementing the indications provided by the crash sensors 32, 34, 36.

A driver's side crash acceleration sensor 46 is mounted on the driver's side of the vehicle and has an axis of sensitivity substantially oriented to sense crash acceleration parallel with the vehicle's Y axis. The crash acceleration sensor 46 provides a crash acceleration signal designated as RAS_1Y having frequency and amplitude characteristics indicative of crash acceleration in the Y axis direction with acceleration into the driver's side of the vehicle having a positive value. A passenger's side crash acceleration sensor 48 is mounted on the passenger's side of the vehicle and oriented to sense crash acceleration parallel with the vehicle's Y axis. The crash acceleration sensor 48 provides a crash acceleration signal designated as RAS_2Y having frequency and amplitude characteristics indicative of crash acceleration in the Y axis direction with acceleration into the passenger's side of the vehicle having a positive value.

The crash acceleration signals CCU_1X, CCU_1Y, CCU_2X, CZS_3X, CZS_4X, RAS_1Y, and RAS_2Y are provided to a controller 50, through associated hardware high pass/low pass filters 52, 54, 56, 58, 60, 62, and 64, respectively. The controller 50 is preferably a microcomputer. Although the preferred embodiment of the invention uses a microcomputer, the invention is not limited to the use of a microcomputer. The present invention contemplates that the functions performed by the microcomputer could be carried out by other digital and/or analog circuitry and can be assembled on one or more circuit boards or as an application specific integrated circuit ("ASIC").

The filters 52–64 filter the crash acceleration signals to remove frequency components that are not useful in discriminating a vehicle crash event, e.g., frequency components resulting from road noise. Frequencies useful for crash discrimination can be determined through empirical testing of a vehicle platform of interest.

The controller 50 monitors the filtered crash acceleration signals and performs one or more crash algorithms to discriminate whether a vehicle deployment or non-deployment crash event is occurring. Each crash algorithm measures and/or determines values of the crash event from the crash acceleration signals. These values are used in deployment and actuation decisions. Such measured and/or determined crash values are also referred to as "crash metrics" and include crash acceleration, crash energy, crash velocity, crash displacement, crash jerk, etc. Based upon the crash acceleration signals, the controller 50 further determines crash severity index values for a crash event using crash severity metrics (described below) and uses these determined crash severity index values in the control of the multistage actuatable restraining devices 14, 18.

Other driver associated sensors are used to detect characteristics of the driver that are or could be used by the controller 50 in its control algorithm to control the actuatable restraining devices 14 and 16. These sensors include a driver's buckle switch sensor 70 that provides a signal to controller 50 indicating whether the driver has his seat belt buckled. Driver's weight sensors 72 located in the driver's seat 74 provide a signal indicative of the driver's sensed weight. Other driver associated sensors 76 provide other driver related information to the controller 50 such as position, height, girth, movement, etc.

Other passenger associated sensors are used to detect characteristics of the passenger that are or could be used by the controller 50 in its control algorithm to control the actuatable restraining devices 18 and 20. These sensors include a passenger's buckle switch sensor 80 that provides a signal to controller 50 indicating whether the passenger has his seat belt buckled. Passenger's weight sensors 82 located in the passenger's seat 84 provide a signal indicative of the passenger's sensed weight. Other passenger associated sensors 86 provide other occupant information to the controller 50 related to the passenger such as position, height, girth, movement, etc. Other sensors 88 provide signals to the controller 50 indicative of whether a passenger is present on the seat 84, whether a child restraining seat is present on the seat 84, etc.

In the preferred embodiment, the air bag restraining device 14 includes a first actuatable stage 90 and a second actuatable stage 92, e.g., two separate sources of inflation fluid in fluid communication with a single air bag restraining device 14. Each stage 90, 92, has an associated squib (not shown) that, when energized with sufficient current for a sufficient time period, initiates fluid flow from an associated fluid source. When one stage is actuated, a percentage less than 100% of the maximum possible inflation occurs. To achieve a 100% inflation, the second stage must be actuated within a predetermined time of the first stage actuation. More specifically, the controller 50 performs a crash algorithm using determined crash metrics and outputs one or more signals to the actuatable restraining device 14 for effecting actuation of one or both actuatable inflation stages 90 and 92 at times to achieve a desired inflation profile and pressure. As mentioned, other actuatable restraining devices such as a pretensioner 22, or other devices such as side restraining devices 16 would be controlled in accordance with the present invention.

As mentioned, each of the actuatable stages 90, 92 includes an associated squib (not shown) of the type well known in the art. Each squib is operatively connected to an associated source of gas generating material and/or a bottle of pressurized gas. The squibs are ignited by passing a predetermined amount of electrical current through them for a predetermined time period. Each squib ignites its associated gas generating material and/or pierces its associated pressurized gas bottle. The amount of gas released into the bag is a direct function of the number of stages actuated and the timing of their actuation. The more stages actuated during predetermined time periods, the more gas present in the air bag. In accordance with an embodiment, the air bag restraining device 14 includes two actuatable stages. If only one stage is actuated, 40% of the maximum possible inflation pressure occurs. If the two stages are actuated within 5 msec. of each other, 100% of the maximum possible inflation pressure occurs. If the stages are actuated approximately 20 msec. apart, a different, lesser percentage of the maximum possible inflation occurs.

By controlling the actuation timing of the multiple stages, the dynamic profile of the bag is controlled, e.g., the inflation rate, the inflation pressure, etc.

The passenger's side restraining device 18 includes a first actuatable stage 94 and a second actuatable stage 96 controlled as described above with regard to the driver's side restraining device 14 to control the percentage of maximum possible inflation pressure of the air bag.

In accordance with the present invention, a deployment controller 100 within the controller 50 controls the actuation of the first actuatable stages 90, 94 and second actuatable stages 92, 96 using determined crash metrics and other monitored sensor inputs.

The two substantially centrally located acceleration sensors 32, 36 sense crash acceleration in the X direction. The first acceleration sensor 32 is used to determine crash metric values associated with an unbuckled vehicle occupant. The second acceleration sensor 36 is used to determine crash metric values associated with a buckled vehicle occupant.

Figure 3:
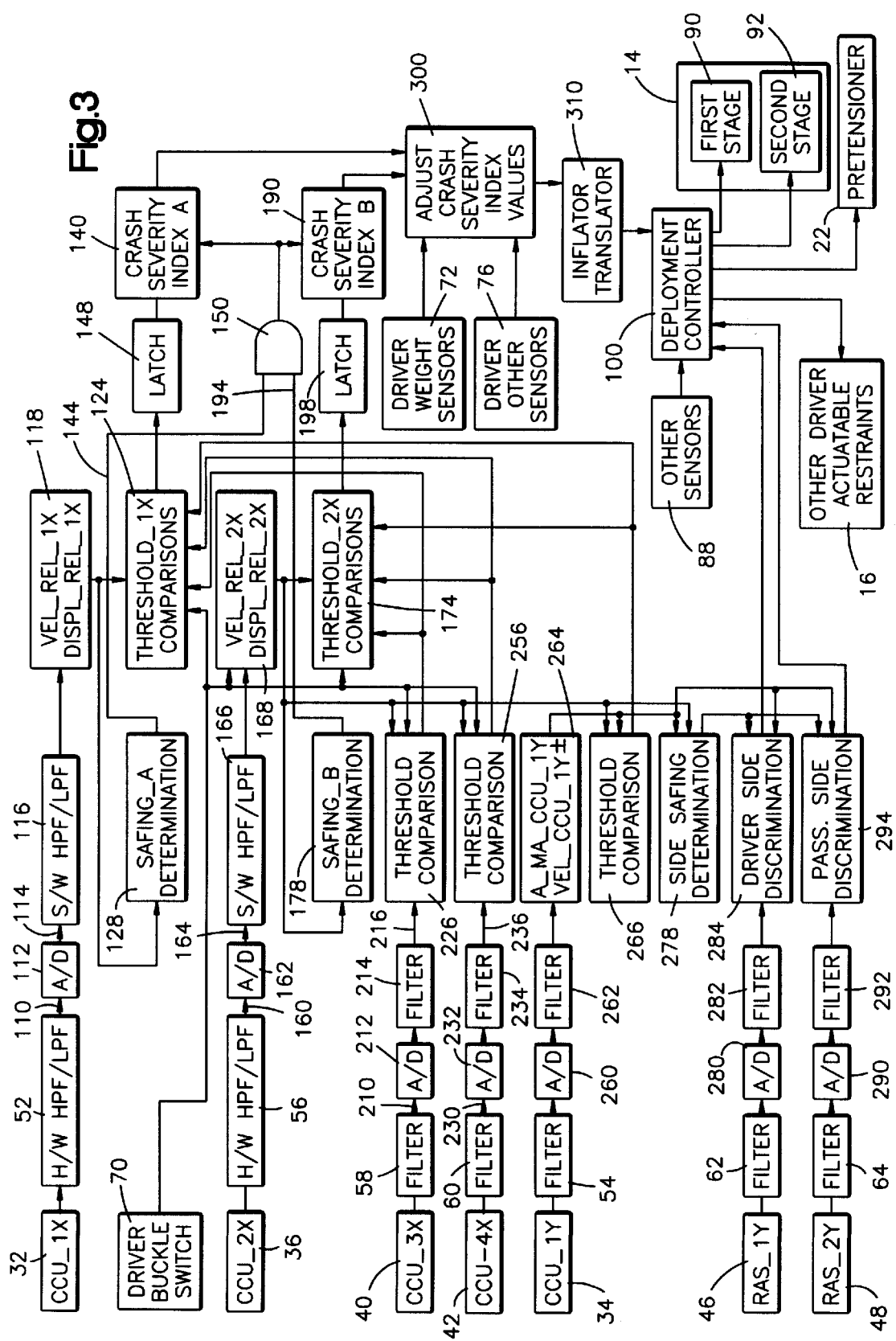
FIG. 3 is a functional block diagram of a portion of an actuatable occupant restraining system of FIG. 2.

Referring to FIGS. 3 and 4, a functional block diagram schematically represents certain of the control functions performed by the controller 50 for the control of the driver's side, multistage restraining device 14. It should be understood that the passenger's side, multistage restraining device 18 is similarly controlled with differences noted below. Preferably, as mentioned, the controller 50 is preferably a microcomputer programmed to perform these illustrated functions. The description of "functions" performed by controller 50 may also be referred to herein as "circuits."

The acceleration sensor 32, preferably an accelerometer, outputs an acceleration signal CCU_1X having a characteristic (e.g., frequency and amplitude) indicative of the vehicle's crash acceleration upon the occurrence of a crash event. The acceleration signal is filtered by, preferably, a hardware (i.e., separate from the controller 50) high-pass-filter ("HPF")/low-pass-filter ("LPF") 52 to eliminate frequencies resulting from extraneous vehicle operating events and/or input signals resulting from road noise. The frequency components removed through filtering are not indicative of the occurrence of a crash event for which deployment of the restraining device 14 is desired. Empirical testing is used to determine the frequency values of relevant crash signals for a particular vehicle platform of interest. Extraneous signal components that may be present in the crash acceleration signal are appropriately filtered and signal characteristics indicative of a deployment crash event are passed for further processing.

The accelerometer 32 preferably has a nominal sensitivity of ±100 g's (g being the value of acceleration due to earth's gravity, i.e., 32 feet per second squared or 9.8 m/s$^2$). In a multistage actuatable restraining system, it is desirable to continue sensing crash acceleration during the crash event, even after a first or initial trigger threshold is reached. Since a first stage actuation is desired upon the occurrence of a crash acceleration well within ±100 g's, the further need for sensing is facilitated with the accelerometer 32 having a nominal sensitivity of ±100 g's.

The filtered output signal 110 is provided to an analog-to-digital (converter) 112, which is preferably internal to the controller 50 (e.g., an A/D input of a microcomputer) or an external A/D converter. The A/D converter 112 converts the filtered crash acceleration signal 110 into a digital signal. The output of the A/D converter 114 is filtered preferably with another high-pass/low-pass filter 116 having filter values empirically determined for the purpose of eliminating small drifts and offsets associated with the A/D conversion. In a microcomputer embodiment of the present invention, the filter 116 would be digitally implemented within the microcomputer. A determination function 118 of the controller 50 determines two crash metric values Vel_Rel_1X ("crash velocity") and Displ_Rel_1X ("crash displacement") from this filtered crash acceleration signal. This is done by first and second integrations of the acceleration signal.

The crash displacement value and crash velocity value are preferably determined using a virtual crash sensing process fully described in U.S. Pat. No. 6,186,539 to Foo et al. and U.S. Pat. No. 6,036,225 to Foo et al. using a spring mass model of the occupant to account for spring forces and damping forces. A detailed explanation of a spring-mass model is found in U.S. Pat. No. 5,935,182 to Foo et al.

The values determined in function 118 are used to compare the Vel_Rel_1X value as a function of Displ_Rel_1X against crash displacement varying thresholds in a comparison function 124 and in a safing determination function 128. The comparison function 124 compares the Vel_Rel_1X value against a LOW threshold 130 or a SWITCHED LOW threshold 132 and also compares the Vel_Rel_1X value against a HIGH threshold 134. The thresholds 130, 132, and 134 are selected for and associated with an unbelted occupant condition as sensed by the driver's buckle switch 70. It is desirable to, according to the present invention, deploy the first stage 90 when the Vel_Rel_1X exceeds the LOW threshold 130 or the SWITCHED LOW threshold 132 (depending on which is used by controller 50 as described below) for the unbelted occupant condition. The second stage 92 is actuated as a function of the time between a LOW (or SWITCHED LOW) threshold crossing and a HIGH threshold crossing which is determined by the crash severity index A function 140 for the unbelted occupant condition. All three thresholds 130, 132, and 134 vary as a function of the crash displacement Displ_Rel_1X value and are empirically determined for a particular vehicle platform of interest.

A safing immunity box 142 is defined as a function of crash velocity Vel_Rel_1X and crash displacement Displ_Rel_1X as shown in FIG. 4. The safing determination function 128 determines if the crash velocity value Vel_Rel_1X as a function of the crash displacement value Displ_Rel_2X is inside or outside the immunity box 142. If velocity value is outside of the immunity box, a HIGH or TRUE safing signal 144 is provided. Otherwise, the safing signal 144 is LOW or FALSE.

The occurrence of the crossing of the thresholds as determined in function 124 are latched by latch 148. The crash severity indexing value A for the unbelted occupant condition is determined in function 140 when a HIGH is received from an AND function 150. AND function 150 is ON or HIGH when two safing functions are satisfied, one based on the CCU_1X signal and the other based on the CCU_2X signal. The output of the Safing_A determination function 128 is one input of the AND function 150. In general, the safing function 150 operates as a control mechanism for enabling or disabling actuation of the first and second stages 90 and 92 through the associated crash severity indexing functions 140 and 190.

The crash severity indexing function A 140 is determined as a function of the time period from when the determined crash velocity value Vel_Rel_1X exceeds the LOW threshold 130 or the SWITCHED LOW threshold 132 to when it exceeds the HIGH threshold 134 and is referred to herein as the "Δt measurement". This value is a measure of the crash intensity. The shorter the time period, the more intense the vehicle crash. It is this measure of Δt that is used in the control of the second stage 92 for the unbelted occupant condition. The second stage is not necessarily deployed at the time of the HIGH threshold crossing, but as a function of the Δt measurement as fully described in the above-mentioned Foo et al. patents. Basically, the crash severity index function 140 can include a look-up table that is used to convert the Δt measurement into a deployment time value that is used to control the timing of second stage actuation.

The acceleration sensor 32 and the comparison function 124 are used for crash discrimination when the vehicle occupant is in an unbelted condition. In an unbelted condition, the thresholds 130, 132, and 134 are overall lower values than those that would be used if the vehicle occupant was belted. The driver's buckle switch 70 is monitored by the controller 50 for use in consideration of the comparison function 124. Control of the passenger's restraining device 14 is similarly controlled taking into consideration a belted or unbelted condition by monitoring the condition of the passenger's buckle switch 80.

The acceleration sensor 36, preferably an accelerometer, outputs an acceleration signal CCU_2X having a characteristic (e.g., frequency and amplitude) indicative of the vehicle's crash acceleration parallel with the X axis of the vehicle upon the occurrence of a crash event. The acceleration signal is filtered by, preferably, a hardware (i.e., separate from the controller 50) high-pass-filter ("HPF")/low-pass-filter ("LPF") 56 to eliminate frequencies resulting from extraneous vehicle operating events and/or input signals resulting from road noise. The frequency components removed through filtering are not indicative of the occurrence of a crash event for which deployment of the restraining device 14 is desired. Empirical testing is used to determine the frequency values of relevant crash signals for the particular vehicle platform of interest. Extraneous signal components that may be present in the crash acceleration signal are appropriately filtered and frequencies indicative of a deployment crash event are passed for further processing.

The accelerometer 36 preferably has a nominal sensitivity of ±100 g's (g being the value of acceleration due to earth's gravity, i.e., 32 feet per second squared or 9.8 m/s$^2$). In a multistage actuatable restraining system, it is desirable to continue sensing crash acceleration during the crash event, even after a first or initial trigger value is reached. Since a first stage actuation is desired upon the occurrence of a crash acceleration well within ±100 g's, the further need for sensing is facilitated with the accelerometer 36 having a nominal sensitivity of ±100 g's.

The filtered output signal 160 is provided to an analog-to-digital (A/D) converter 162, which is preferably internal to the controller 50 (e.g., an A/D input of a microcomputer) or an external A/D converter. The A/D converter 162 converts the filtered crash acceleration signal 160 into a digital signal. The output 164 of the A/D converter is filtered preferably with another high-pass/low-pass filter 166 having filter values empirically determined for the purpose of eliminating small drifts and offsets associated with the A/D conversion. In a microcomputer embodiment of the present invention, the filter 166 would be digitally implemented within the microcomputer. The determination function 168 of the controller 50 determines two crash metric values Vel_Rel_2X ("crash velocity") and Displ_Rel_2X ("crash displacement") from this filtered crash acceleration signal CCU_2X in a similar manner as the determination made in function 118. This is done by first and second integrations of the filtered acceleration signal CCU_2X.

These crash displacement and crash velocity values are preferably determined using virtual crash sensing processing fully described in U.S. Pat. No. 6,186,539 to Foo et al. and U.S. Pat. No. 6,036,225 to Foo et al. using a spring mass model of the occupant to account for spring forces and damping forces. A detailed explanation of a spring-mass model is found in U.S. Pat. No. 5,935,182 to Foo et al.

The values determined by function 168 are used to compare the Vel_Rel_2X value as a function Displ_Rel_2X against crash displacement varying thresholds in a comparison function 174 and in a sating determination function 178. The comparison function 174 compares the Vel_Rel_2X value against a LOW threshold 180 or a SWITCHED LOW threshold 182 and compares the Vel_Rel_2X against a HIGH threshold 184. The thresholds 180, 182, and 184 are selected for and associated with a belted occupant condition as monitored by the driver's buckle switch 70. It is desirable to, according to the present invention, deploy the first stage 90 when the Vel_Rel_2X exceeds the LOW threshold 180 or the SWITCHED LOW threshold 182 (depending on which is used) for the belted occupant condition. The second stage is actuated as a function of the time from the LOW (or SWITCHED LOW) threshold crossing to the HIGH threshold crossing which is determined by the crash severity index B function 190 for the belted occupant condition. All three thresholds 180, 182, and 184 vary as a function of the Displ_Rel_2X value and are empirically determined for a belted occupant condition. A safing immunity box 192 is defined as a function of Vel_Rel_2X and Displ_Rel_2X as shown in FIG. 4. When the Vel_Rel_2X value is outside of the immunity box 192, a HIGH or TRUE safing signal 194 is provided to the second input of the AND function 150. Otherwise, the safing signal 194 is LOW or FALSE. If both inputs to the AND function 150 are HIGH, the output of the AND gate 150 is HIGH which will enable both crash severity indexing functions 140, 190.

The occurrence of the crossing of the thresholds as determined in function 174 are latched by latch 198 and the crash severity indexing value B for the belted occupant condition is determined in function 190 when a HIGH is received from the AND function 150.

The crash severity function B is determined as a function of the time period from when the determined velocity value Vel_Rel_2X exceeds the LOW threshold 180 or the SWITCHED LOW threshold 182 to when it exceeds the HIGH threshold 184 and is referred to herein as the "Δt measurement". This value is a measurement of the crash intensity. The shorter the time period, the more intense the vehicle crash. It is this measurement of Δt that is used in the control of the second stage for the belted occupant condition. The threshold for the belted comparisons used in function 174 are typically higher values than those for the unbelted condition used in comparison function 124. As similarly described with reference to function 140, crash severity index B function could include a look-up table to convert the Δt measurement to an actuation time for control of the second stage 92.

If the crush zone sensors 40, 42 detected certain events, the LOW thresholds 130, 180 are switched to the SWITCHED LOW thresholds 132, 182 to control the deployment of the first stage 90 and for the determination of the Δt measurement used in the crash severity functions 140, 190 that are, in turn, used to control the second stage 92.

The crush zone sensor 40 is preferably an accelerometer providing a signal CCU_3X having a characteristic (e.g., frequency and amplitude) indicative of the vehicle's crash acceleration upon the occurrence of a crash event as sensed at the forward, front left location of the vehicle. The acceleration signal CCU_3X is filtered by, preferably, a hardware high-pass-filter ("HPF")/low-pass-filter ("LPF") 58 to eliminate frequencies resulting from extraneous vehicle operating events and/or inputs resulting from road noise. The frequency components removed through filtering are those frequencies not indicative of the occurrence of a crash event. Empirical testing is used to establish a frequency range or ranges of the relevant crash signals so that extraneous signal components present in the crash acceleration signal can be filtered and frequencies indicative of a crash event passed for further processing. The accelerometer 40 preferably has a nominal sensitivity of ±250 g's.

The filtered output signal 210 is provided to an analog-to-digital ("A/D) converter 212, which may be internal to the controller 50 (e.g., an A/D input of a microcomputer) or an external A/D converter. The A/D converter 212 converts the filtered crash acceleration signal 210 into a digital signal. The output of the A/D converter 212 is filtered preferably with another high-pass/low-pass filter 214 having filter values empirically determined for the purpose of eliminating small drifts and offsets resulting from the conversion. In a microcomputer embodiment of the present invention, the filter 214 would be digitally implemented within the microcomputer. The filtering function 214 outputs a filtered acceleration signal 216.

The controller 50 determines an acceleration value designated A_MA_CZS_3X. This value is determined by calculating a moving average value of the filtered acceleration signal from the first crush zone sensor 40. A moving average is a sum of the last predetermined number of samples of the filtered acceleration signal. The average is updated by removing the oldest value, replacing it with the latest sample, and then determining the new average. It has been determined that 4 to 32 samples provide a good average.

This determined crush zone sensor acceleration value A_MA_CZS_3X as a function of the determined displacement value Displ_Rel_2X is compared against an unbelted threshold 220 and a belted threshold 222 in a threshold comparison function 226. The belted threshold 222 and the unbelted threshold 220 vary as a function of Displ_Rel_2X in a predetermined manner to achieve the desired control. The thresholds may be determined empirically for a particular vehicle platform of interest. If the A_MA_CZS_3X value exceeds the unbelted threshold 220, the lower threshold used in the comparison function 124 is switched to the SWITCHED LOW threshold 132. If the A_MA_CZS_3X value exceeds the belted threshold 222, the lower threshold used in the comparison function 174 is switched to the SWITCHED LOW threshold 182.

The crush zone sensor 42 is preferably an accelerometer providing a signal CCU_4X having a characteristic (e.g., frequency and amplitude) indicative of the vehicle's crash acceleration upon the occurrence of a crash event as sensed at the forward, front right location of the vehicle. The acceleration signal CCU_4X is filtered by, preferably, a hardware high-pass-filter ("HPF")/low pass filter ("LPF") 60 to eliminate frequencies resulting from extraneous vehicle operating events and/or inputs resulting from road noise. The frequency components removed through filtering are those frequencies not indicative of the occurrence of a crash event. Empirical testing is used to establish a frequency range or ranges of the relevant crash signals so that extraneous signal components present in the crash acceleration signal can be filtered and frequencies indicative of a crash event passed for further processing. The accelerometer 42 preferably has a nominal sensitivity of ±250 g's.

The filtered output signal 230 is provided to an analog-to-digital ("A/D") converter 232, which may be internal to the controller 50 (e.g., an A/D input of a microcomputer) or an external A/D converter. The A/D converter 232 converts the filtered crash acceleration signal 230 into a digital signal. The output of the A/D converter 232 is filtered preferably with another high-pass/low-pass filter 234 having filter values empirically determined for the purpose of eliminating small drifts and offsets resulting from the conversion. In a microcomputer embodiment of the present invention, the filter 234 would be digitally implemented within the microcomputer. The filtering function 234 outputs a filtered acceleration signal 236.

The controller 50 determines an acceleration value designated A_MA_CZS_4X. This value is determined by calculating a moving average value of the filtered acceleration signal of the crush zone sensor 42. A moving average is a sum of the last predetermined number of samples of the filtered acceleration signal. The average is updated by removing the oldest value, replacing it with the latest sample, and then determining the new average. It has been determined that 4 to 32 samples provide a good average.

This determined crush zone sensor acceleration value A_MA_CZS_4X as a function of the determined displacement value Displ_Rel_2X is compared against an unbelted threshold 250 and a belted threshold 252 in a threshold comparison function 256. The belted threshold 252 and the unbelted threshold 250 vary as a function of Displ_Rel_2X in a predetermined manner to achieve the desired control. The values may be determined empirically for a particular vehicle platform of interest. If the A_MA_CZS_4X value exceeds the unbelted threshold 250, the lower threshold used in the comparison function 124 is switched to the SWITCHED LOW threshold 132. If the A_MA_CZS_4X value exceeds the belted threshold 252, the lower threshold used in the comparison function 174 is switched to the SWITCHED LOW threshold 182.

The central Y axis accelerometer 34 outputs an acceleration signal CCU_1Y to a filter 54. The filter signal from 54 is converted by an A/D converter 260 and digitally filtered by filter 262 in a similar manner as described above relative to processing of the signals from accelerometers 40, 42. From this filtered acceleration signal, a moving average acceleration value A_MA_CCU_1Y value (transverse crash acceleration) is determined using a moving average technique and a velocity value VEL_CCU_1Y value is determined by integration in determining function 264. In comparison function 266, the determined transverse crash acceleration value A_MA_CCU_1Y as a function of the determined displacement value Displ_Rel_2X is compared against a transverse threshold 268. If the A_MA_CCU_1Y value exceeds the transverse threshold 268, the LOW threshold used in the comparison function 124 is switched to the SWITCHED LOW threshold 132 and the LOW threshold used in the comparison function 174 is switched to the SWITCHED LOW threshold 182.

The A_MA_CCU_1Y value is also compared to an immunity box 276 defined by a predetermined A_MA_CCU_1Y value and a Displ_Rel_2X value as shown in FIG. 4 by a comparison function 278. If the A_MA_CCU_1Y value is outside of the immunity box 276, a HIGH safing signal is provided for use with a side crash discrimination algorithm described below. Otherwise, the safing signal is LOW.

The driver's side acceleration sensor 46 provides an acceleration signal RAS_1Y to a filter 62 which is converted by A/D converter 280. The digitized acceleration signal is further digitally filtered by filter 282 and the filtered acceleration signal is provided to a driver side discrimination function 284.

The passenger's side acceleration sensor 48 provides an acceleration signal RAS_2Y to a filter 64 which is converted by A/D converter 290. The digitized acceleration signal is further digitally filtered by filter 292 and the filtered acceleration signal is provided to a passenger side discrimination function 294.

The driver side discrimination function and passenger side discrimination function can take any of several forms for side discrimination and control of the respective side restraining devices 16, 20. In accordance with one embodiment, a driver's side acceleration value A_MA_RAS_1Y and a passenger's side acceleration value A_MA_RAS_2Y are determined using a moving average process in a similar manner as described above with regard to other moving average acceleration determinations. These determined side acceleration values as a function of the determined side velocity value VEL_CCU_1Y in both positive and negative directions are compared against associated variable thresholds. If the values exceed their associated thresholds and the side safing signal from function 278 is HIGH, the appropriate side restraining device 16, 20 is actuated.

The crash severity INDEX_A 140 and the crash severity INDEX_B 190 are connected to an adjustment function 300. The adjustment function 300 receives further input signals from the driver's weight sensor 72 and from the other associated driver's sensors 76 mentioned above. The adjustment function 300 adjusts the crash severity index values A or B in response to the sensors 72, 76. Depending on the sensed weight of the occupant and other sensed characteristics or attributes, the index values A, B will be increased, decreased, or left without further adjustment.

The adjusted crash severity index values are passed to an inflator translator 310 which makes further adjustments to the crash severity values for the particular inflator or inflator type used in the vehicle platform of interest. The translator can be used to select second stage deployment times based on whether the LOW threshold was used or the SWITCHED LOW threshold was used for control of the first stage. For example, assume that a Δt time was 25 msec. If the SWITCHED LOW threshold was used, the second stage could be actuated 25 msec. after the first stage actuation. However, if the "normal" LOW threshold (130, 180) was used for control of the first stage with the same Δt, the second stage could be actuated 40 msec. after the first stage actuation.

The particular "inflator type" data can be input to the controller 50 through appropriate sensors or can be prestored at the time of initial programming of the controller 50. In this way, the deployment of the first stage 90 and the second stage 92 could be advanced or retarded in response to the inflator type. For example, one vehicle may require series activation within 5 msec. to achieve 100% inflation. Another vehicle may require series activation within 7 msec. to achieve 100% inflation because of a difference in inflator type.

The output of the translator 310, which is the adjusted Δt value, is passed to the deployment controller 100. The deployment controller 100 actuates the first actuatable stage 90 (subject to possible advancement or retarding by the adjustment function 300 and/or the translator 310) for the driver's multistage restraining device 14 when the threshold 130 is exceeded and the driver buckle switch 70 indicates the driver is unbuckled and neither of the unbelted thresholds 220 or 250 were exceed by A_MA_CZS_3X and A_MA_CZS_4X, respectively, and A_MA_CCU_1Y did not exceed threshold 268.

The deployment controller 100 actuates the first actuatable stage 90 (subject to possible advancement or retarding by the adjustment function 300 and/or the translator 310) for the driver's multistage restraining device 14 when the threshold 180 is exceeded and the driver buckle switch 70 indicates the driver is buckled and neither of the belted thresholds 222 or 252 were exceed by A_MA_CZS_3X and A_MA_CZS_4X, respectively, and A_MA_CCU_1Y did not exceed threshold 268.

The deployment controller 100 actuates the first actuatable stage 90 (subject to possible advancement or retarding by the adjustment function 300 and/or the translator 310) for the driver's multistage restraining device 14 when the threshold 132 is exceeded and the driver buckle switch 70 indicates the driver is unbuckled and one of unbelted thresholds 220 or 250 were exceed by A_MA_CZS_3X and A_MA_CZS_4X, respectively, or A_MA_CCU_1Y exceed threshold 268.

The deployment controller 100 actuates the first actuatable stage 90 (subject to possible advancement or retarding by the adjustment function 300 and/or the translator 310) for the driver's multistage restraining device 14 when the threshold 182 is exceeded and the driver buckle switch 70 indicates the driver is buckled and one of the belted thresholds 222 or 252 were exceed by A_MA_CZS_3X and A_MA_CZS_4X, respectively, or A_MA_CCU_1Y exceeded threshold 268.

If the restraining system includes a pretensioner 22, then the pretensioner is actuated when the first stage 90 is actuated if the buckle switch indicates the driver is buckled.

The then determined Δt times are used to control when the second stage 92 is actuated. The deployment controller 100 controls the actuation of the second stage 92 in response to the appropriate adjusted crash severity index values Index_A or Index_B depending on the belted condition of the occupant. The controller 50 uses a look-up table having predetermined stored actuation times for control of the second stage deployment in response to the appropriate crash severity index value. These stored values are determined through empirical methods for a particular vehicle platform of interest.

Other sensors 88 could be used to make further control adjustments. For example, if a rearward facing child seat is detected on the passenger's seat 84, actuation of the first and second stages 94, 96 could be prevented.

From the above description of the invention, those skilled in the art will perceive improvements, changes and modifications. For example, the switched thresholds were responsive to both the crush zone sensors CZS_3X and CZS_4X and in response to the side acceleration sensor CCU_1Y. The switching of the thresholds could have been responsive to only the crush zone sensors CZS_3X and CZS_4X or only the transverse acceleration CCU_1Y. Such improvements, changes, and/or modifications within the skill of the art are intended to be covered by the appended claims.

Having described the invention, the following is claimed:

1. An apparatus for controlling a vehicle actuatable occupant restraining system comprising:
   a first crash accelerometer sensing crash acceleration and providing a first crash acceleration signal indicative thereof;

means for determining crash velocity in response to the first crash acceleration signal;

means for determining crash displacement in response to the first crash acceleration signal;

a controller actuating the actuatable occupant restraining system in response to the determined crash velocity as a function of crash displacement exceeding a selected one of a discrimination threshold and a switched discrimination threshold;

a second accelerometer sensing transverse crash acceleration and providing a transverse crash acceleration signal indicative thereof; and said controller including means for comparing a value functionally related to the transverse crash acceleration as a function of the determined crash displacement against a transverse threshold and means for selecting one of the discrimination threshold and the switched discrimination threshold in response to the comparison of the value functionally related to the transverse acceleration against the transverse threshold.

2. The apparatus of claim 1 wherein said controller further includes means for comparing said determined crash velocity against a high discrimination threshold and controlling a second stage of said actuatable restraining system in response to the time between said crash velocity exceeding the selected one of said discrimination threshold and said switched discrimination threshold to when said crash velocity exceeds said high discrimination threshold.

3. An apparatus for controlling a vehicle actuatable occupant restraining system comprising:

a first crash acceleration sensor sensing crash acceleration and providing a first crash acceleration signal indicative thereof;

means for determining crash velocity in response to the first crash acceleration signal;

means for determining crash displacement in response to the first crash acceleration signal;

a controller actuating the actuatable occupant restraining system in response to the determined crash velocity as a function of crash displacement exceeding one of a first discrimination threshold and a second discrimination threshold;

a second accelerometer sensing transverse crash acceleration and providing a transverse crash acceleration signal; and said controller including means for comparing a value functionally related to the transverse acceleration as a function of the determined crash displacement against a transverse threshold, said controller actuating said occupant restraining system in response to said crash velocity exceeding said first discrimination threshold and said value functionally related to the transverse acceleration being less than said transverse threshold and actuating said occupant restraining system in response to said crash velocity exceeding said second discrimination threshold and said value functionally related to the transverse acceleration is greater than said transverse threshold.

4. An apparatus for controlling a vehicle multistage actuatable occupant restraining system comprising:

a first crash accelerometer sensing crash acceleration and providing a first crash acceleration signal indicative thereof;

means for determining crash velocity in response to the first crash acceleration signal;

means for determining crash displacement in response to the first crash acceleration signal;

a controller for comparing the determined crash velocity as a function of crash displacement against one of a low discrimination threshold and a switched low discrimination threshold;

a second accelerometer sensing transverse crash acceleration; and said controller including means for comparing a value functionally related to the transverse crash acceleration as a function of the crash displacement against a transverse threshold, and means for selecting said one of said low discrimination threshold and said switched low discrimination threshold in response to the transverse crash acceleration comparison, said controller actuating a first stage of said multistage occupant restraining system in response to said determined crash velocity exceeding the selected one of said low discrimination threshold or switched low discrimination threshold.

5. The apparatus of claim 4 wherein said controller further includes means for comparing said determined crash velocity against a high discrimination threshold and controlling a second stage of said actuatable restraining system in response to the time between said crash velocity exceeding the selected one of said discrimination threshold and said switched low discrimination threshold to when said crash velocity exceeds said high discrimination threshold.

6. A method for controlling a vehicle actuatable occupant restraining system comprising:

sensing crash acceleration;

determining crash velocity in response to the sensed crash acceleration;

determining crash displacement in response to the sensed crash acceleration;

sensing transverse crash acceleration;

comparing a value functionally related to the transverse acceleration as a function of the determined crash displacement against a transverse threshold;

switching the value of the discrimination threshold to a switched discrimination threshold when the value functionally related to the transverse acceleration exceeds the transverse threshold; and actuating the actuatable occupant restraining system in response to the determined crash velocity as a function of crash displacement exceeding one of the discrimination threshold and the switched discrimination threshold.

7. A method for controlling a vehicle actuatable occupant restraining system comprising:

sensing crash acceleration;

determining crash velocity in response to the sensed crash acceleration;

determining crash displacement in response to the sensed crash acceleration;

sensing transverse acceleration; and comparing a value functionally related to the transverse acceleration as a function of the determined crash displacement against a transverse threshold; and actuating said occupant restraining system in response to said crash velocity exceeding a first discrimination threshold and said value functionally related to the transverse acceleration being less than said transverse threshold and actuating said occupant restraining system in response to said determined crash velocity exceeding a second discrimination threshold when said value functionally related to the transverse acceleration is greater than said transverse threshold.

8. A method for controlling a vehicle multistage actuatable occupant restraining system comprising the steps of:

sensing crash acceleration and providing a crash acceleration signal indicative thereof;

determining crash velocity in response to the crash acceleration signal;

determining crash displacement in response to the crash acceleration signal;

comparing the determined crash velocity as a function of crash displacement against one of a low discrimination threshold and a switch low discrimination threshold;

sensing transverse crash acceleration;

comparing a value functionally related to transverse crash acceleration as a function of the crash displacement against a transverse threshold and selecting one of a low discrimination threshold and a switched low discrimination threshold in response thereto; and actuating a first stage of said multistage occupant restraining system in response to said determined crash velocity exceeding the selected one of said low discrimination threshold and switched low discrimination threshold.

9. An apparatus for controlling a vehicle actuatable occupant restraining system comprising:

a crash accelerometer sensing crash acceleration and providing a crash acceleration signal indicative thereof;

means for determining crash velocity in response to the crash acceleration signal;

means for determining crash displacement in response to the crash acceleration signal;

a controller actuating the actuatable occupant restraining system in response to the determined crash velocity as a function of crash displacement exceeding a selected one of a low discrimination threshold and a switched low discrimination threshold;

a crush zone accelerometer for sensing crush zone acceleration at a crush zone location of the vehicle and providing a crush zone acceleration signal indicative thereof;

a transverse accelerometer sensing transverse crash acceleration and providing a transverse crash acceleration signal indicative thereof; and said controller including means for comparing a value functionally related to the transverse crash acceleration signal as a function of the determined crash displacement against a transverse threshold, means for comparing a value functionally related to the crush zone acceleration as a function of the determined crash displacement against a crush zone threshold, and means for selecting one of the low discrimination threshold and the switched low discrimination threshold in response to at least one of the value functionally related to the transverse acceleration exceeding the transverse threshold and the value functionally related to the crush zone acceleration exceeding the crush zone threshold.

10. A method for controlling a vehicle actuatable occupant restraining system comprising:

sensing crash acceleration and providing a crash acceleration signal indicative thereof;

determining crash velocity in response to the crash acceleration signal;

determining crash displacement in response to the crash acceleration signal;

actuating the actuatable occupant restraining system in response to the determined crash velocity as a function of crash displacement exceeding a selected one of a low discrimination threshold and a switched low discrimination threshold;

sensing crush zone acceleration at a crush zone location of the vehicle and providing a crush zone acceleration signal indicative thereof;

sensing transverse crash acceleration and providing a transverse crash acceleration signal indicative thereof;

comparing a value functionally related to the transverse crash acceleration as a function of the determined crash displacement against a transverse threshold;

comparing a value functionally related to the crush zone acceleration as a function of the determined crash displacement against a crush zone threshold; and selecting one of the low discrimination threshold and the switched low discrimination threshold in response to at least one of the value functionally related to the transverse acceleration exceeding the transverse threshold and the value functionally related to the crush zone acceleration exceeding the crush zone threshold.

* * * * *